United States Patent
Couderc et al.

(10) Patent No.: US 7,800,817 B2
(45) Date of Patent: Sep. 21, 2010

(54) DEVICE FOR PRODUCTION OF A POLYCHROMATIC LIGHT OVER A CONTINUOUS SPECTRUM BY EXCITATION AT ONE WAVELENGTH

(75) Inventors: Vincent Couderc, Verneuil sur Vienne (FR); Philippe Leproux, Limoges (FR); Vincent Tombelaine, Limoges (FR); Pierre-Alain Champert, Langoat (FR); Sébastien Février, Limoges (FR); Alain Barthélémy, Limoges (FR); Jean-Louis Auguste, Limoges (FR); Jean-Marc Blondy, Limoges (FR)

(73) Assignees: Centre National de la Recherche Scientifique-CNRS (FR); Universite de Limoges (FR)

( * ) Notice: Subject to any disclaimer, the term of this patent is extended or adjusted under 35 U.S.C. 154(b) by 0 days.

(21) Appl. No.: 11/918,355

(22) PCT Filed: Apr. 14, 2006

(86) PCT No.: PCT/FR2006/000830

§ 371 (c)(1),
(2), (4) Date: Nov. 26, 2008

(87) PCT Pub. No.: WO2006/108966

PCT Pub. Date: Oct. 19, 2006

(65) Prior Publication Data
US 2009/0213614 A1 Aug. 27, 2009

(30) Foreign Application Priority Data
Apr. 15, 2005 (FR) .................... 05 03807

(51) Int. Cl.
*G02F 1/35* (2006.01)
*H01S 3/10* (2006.01)

(52) U.S. Cl. .............. 359/326; 359/328; 372/22; 385/126

(58) Field of Classification Search ......... 359/328–332; 372/6, 21, 22; 385/126, 127
See application file for complete search history.

(56) References Cited

U.S. PATENT DOCUMENTS 5,999,548 A * 12/1999 Mori et al. .................... 372/22

(Continued)

FOREIGN PATENT DOCUMENTS

EP 1 148 360 A2 10/2001

(Continued)

OTHER PUBLICATIONS

T. Schreiber et al., "High average power supercontinuum generation in photonic crystal fibers," Optics Communications, North-Holland Publishing Co., Amsterdam, NL, vol. 228, No. 1-3, Dec. 1, 2003, pp. 71-78.

(Continued)

*Primary Examiner*—Hemang Sanghavi
(74) *Attorney, Agent, or Firm*—DLA Piper LLP (US)

(57) ABSTRACT

A device for producing a polychromatic light including an optical pump that delivers a first radiation at a first wavelength; a light guide; and a selective injector that injects the radiation into the guide, the guide being arranged to generate a harmonic corresponding to the selected injector and provide a polychromatic light at an outlet, by non-linear excitation of the first radiation and the harmonic.

3 Claims, 4 Drawing Sheets

U.S. PATENT DOCUMENTS

2005/0105867 A1* 5/2005 Koch et al. .................. 385/125
2005/0117841 A1* 6/2005 Braun et al. .................. 385/27

FOREIGN PATENT DOCUMENTS

WO    WO 03096490 A2 * 11/2003

OTHER PUBLICATIONS

P-A Champert et al., "White-light supercontinuum generation in normally dispersive optical fiber using original multi-wavelength pumping system," Optics Express, Optical Society of America, Washington, DC, US, vol. 12, No. 19, Sep. 20, 2004, pp. 4366-4371.

* cited by examiner

US 7,800,817 B2

DEVICE FOR PRODUCTION OF A POLYCHROMATIC LIGHT OVER A CONTINUOUS SPECTRUM BY EXCITATION AT ONE WAVELENGTH

RELATED APPLICATION

This is a §371 of International Application No. PCT/FR2006/000830, with an international filing date of Apr. 14, 2006 (WO 2006/108966 A1, published Oct. 19, 2006), which is based on French Patent Application No. 05/03807, filed Apr. 15, 2005.

TECHNICAL FIELD

This disclosure relates to devices for producing a polychromatic light over a continuous spectrum by excitation at one wavelength, more particularly, to producing a wide spectrum white light.

BACKGROUND

Utilization of a source directly emitting a wide spectrum white light such as an incandescent lamp or a quartz lamp is already known. The direct utilization of such sources has numerous disadvantages such as, for example, the overall dimension, the isotropic emission or the weak luminance.

To obtain a wide-band white light, it has been attempted to associate in parallel a great number of mono-frequency laser diodes, but it should be understood that the spectrum is not continuous. Besides, variations in intensity may occur between the diodes.

Another known means for obtaining such a light is pumping a micro-structured optical fiber with a mono-frequency laser which works in pulsed operation, with pulses of the order of a nanosecond, a picosecond or a femtosecond for distribution frequencies between the kilo-hertz to the mega-hertz. It is known that such pumping induces non-linear effects in the micro-structured fiber which allow the generation of photons having various wavelengths. This type of source has been described in the publication by J. K Ranka et al., Optics Letters, Vol. 25, No. 1, p. 25-27, 2000 and in the document by J. C. Knight et. al., Optics Letters, Vol. 26, No. 17, pages 1356-1358, 2001. The disadvantages of such a source are the overall dimensions and the cost which prevents its utilization in an integrated product.

FR 04 02589, filed on Mar. 12, 2004 and not yet published, discloses, as illustrated in FIG. 1, a device comprising an optical pumping module MP in charge of providing a radiation having at least two different excitation wavelengths $\lambda 1$ and $\lambda 2$. It also comprises light guidance means GL which, when they are excited by a radiation including several wavelengths provided by the pumping module MP in a non-linear light-material interaction regime, provide a polychromatic light corresponding to a continuum at their outlet SGL.

FR 04 02589 discloses, in a mono-modal fiber using a negative dispersion regime, the pumping by a mono-frequency source gives rise to the generation of Raman discrete lines for high wavelengths. On the contrary, in the case of pumping with at least two judiciously selected wavelengths, it was demonstrated that a symmetrical homogeneous spectral spreading appeared on either side of the one the pumping wavelengths, as well as a minimization of the Raman components. This modification is mainly the result of a competition phenomenon between the non-linear effects. The spectral spreading can be explained by the combination of the phase self-modulation, the crossed phase modulation and the parametric effects (four wave mixture). The addition of a second pumping power then makes it possible to initiate initial phase matching between the wavelengths centered around $\lambda 1$ and $\lambda 2$ and the occurrence of the parametric effects which have an occurrence threshold lower than that of the Raman effect. As illustrated in FIG. 1, such a device thus comprises pumping means MP which generate two wavelengths $\lambda 1$ and $\lambda 2$ at the outlet SMP. Such radiation then goes into the guidance means GL through the inlet EGL and a wide-spectrum white light is emitted at the outlet of the guide GL through the outlet SGL.

Although FR 04 02589 already solves many problems in the field of obtaining a white light, it requires a double pumping which requires either a double pump or a frequency doubler which can be a problem.

It could therefore be advantageous to simplify the previously described device while still having satisfactory results as regards the emitted light and at making it possible to obtain a spectrum without any discontinuity.

SUMMARY

We provide a device for producing a polychromatic light including an optical pump that delivers a first radiation at a first wavelength, a light guide, and a selective injector that injects the radiation into the guide, the guide being arranged to generate a harmonic corresponding to the selected injector and provide a polychromatic light at an outlet, by nonlinear excitation of the first radiation and the harmonic.

BRIEF DESCRIPTION OF THE DRAWINGS

Our devices will be better understood when reading the description given hereinunder only for the explanation of a representative example and while referring to the appended Figures in which.

DETAILED DESCRIPTION

We provide a device for generating a polychromatic light comprising optical pumping means and light guidance means, the optical pumping means being capable of producing a first radiation at a first wavelength, characterized in that it includes a selective injection means for injecting the radiation into the guidance means, the guidance mean being so arranged as to generate a harmonic corresponding to the selective injection and to produce at an outlet a polychromatic light by a non-linear excitation of the first radiation and the harmonic.

The guidance means may include a light guide for example of the optical fiber type.

Advantageously, to generate the harmonic while transmitting the first radiation, the guidance means, or more precisely the fiber, are substantially mono-modal at the level of the first wavelength and substantially multimode at the level of the wavelength corresponding to the second harmonic.

Preferably, to raise the generation rate of the harmonic, the guidance means, or more precisely the fiber, are doped with germanium and/or submitted to a poling treatment.

Advantageously, to control the propagation of the radiations and their spectral properties, the guidance means include a micro-structured fiber.

Figure 1:
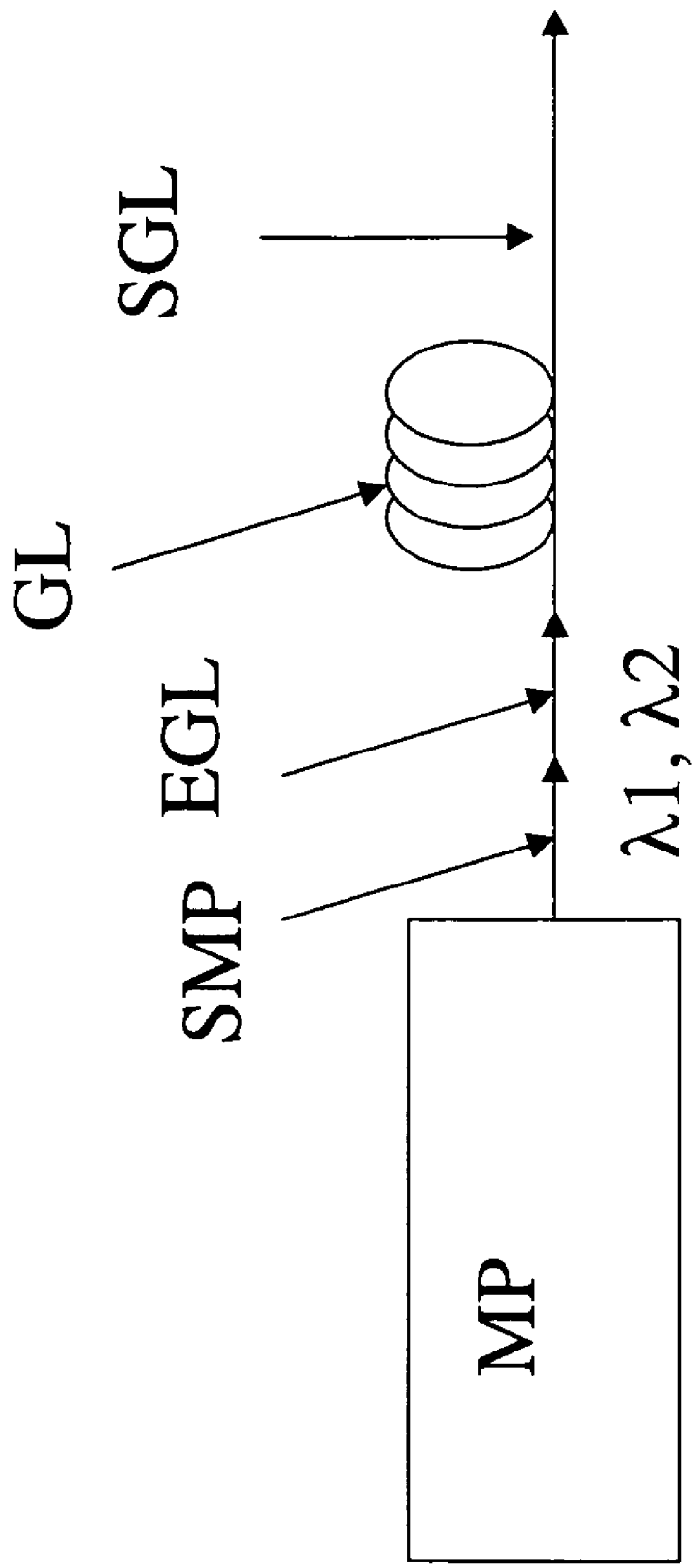
FIG. 1 illustrates a device such as described in FR 04 02589.
Figure 2:
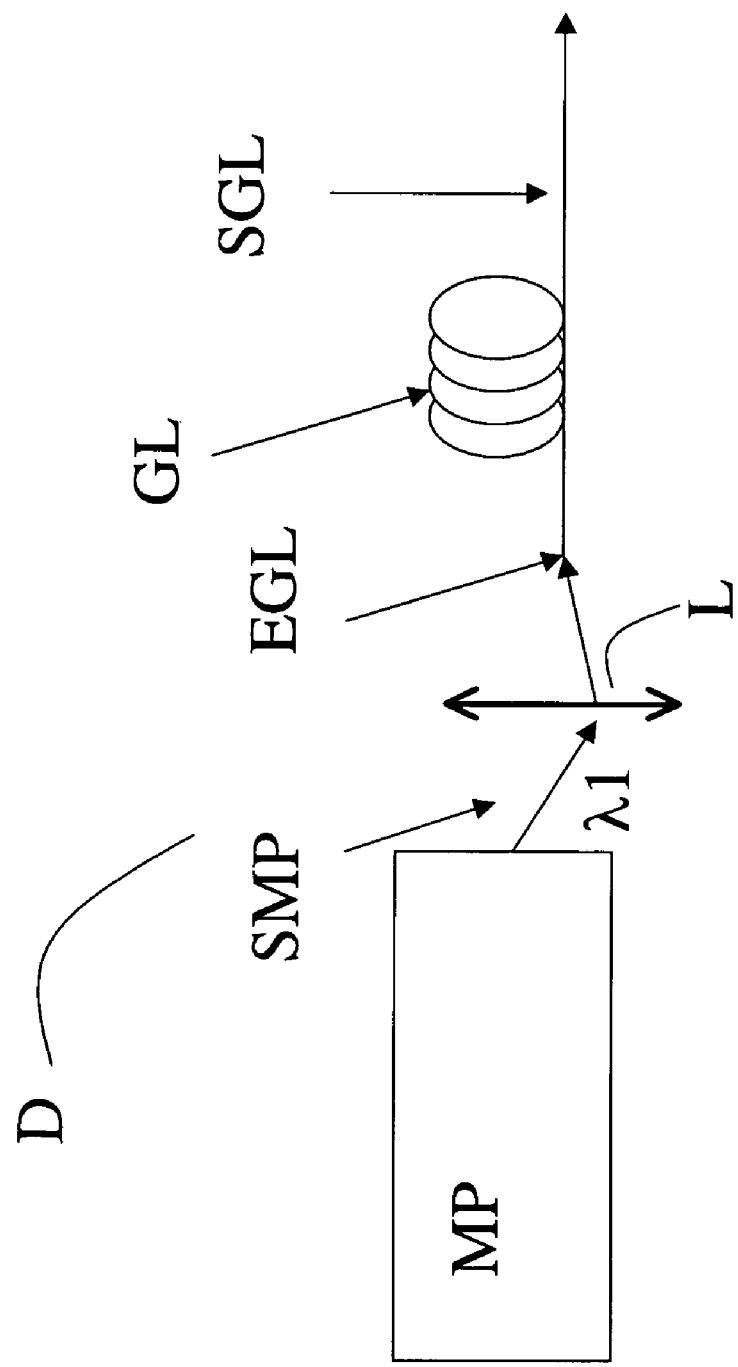
FIG. 2 illustrates one of our devices.

Referring to FIG. 2, the device comprises a device D dedicated to the generation of a polychromatic wave.

Such device D first includes an optical pumping module MP in charge of producing a radiation. Quite originally, it is sufficient for such pumping means to produce a radiation having only one wavelength λI. It should be understood that these means can produce more than one wavelength, but the technical problem of the emission of a white light is solved with only one wavelength.

For example, the pumping means can be in the form of a monochromatic laser source SL. It should be understood that any pumping means capable of producing a radiation having at least one wavelength can be used.

As an example and to best describe our devices, the emission of a radiation at 1064 nm at the outlet SMP of the pumping means MP has been considered. Besides, the pumping module used can be operated either in pulsed mode or in a continuous or quasi-continuous mode.

The device D also includes light guidance means GL in charge of producing, at their outlet SGL, a polychromatic light corresponding to a continuum.

A polychromatic light means a light the spectrum of which is substantially continuous and not discretized as regards its wavelength on a wide band.

Preferably, the guidance means GL used is an optical fiber and more generally a light guide the non-linear properties of which depend on its structure and its dimensions. For example, a so-called "micro-structured fiber" is used. Such type of optical fiber has an opto-geometrical structure which can be modified upon its creation and which makes it possible to control the dispersion profile and allows to guide the light on the whole transmission band of the fiber material.

Figure 3:
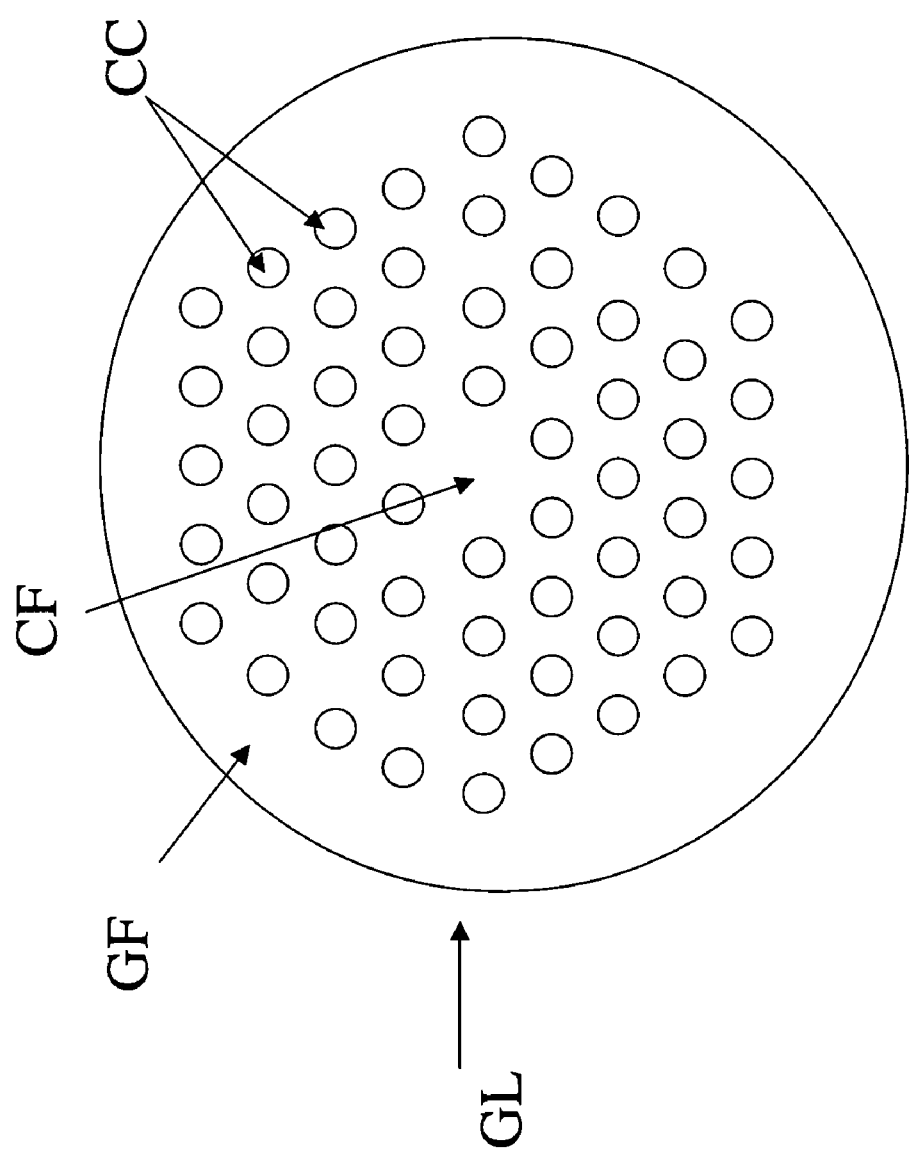
FIG. 3 shows a cross-sectional view of a fiber used.

For example, the optical fiber GL can be a hole type optical fiber, similar to that illustrated in FIG. 3 in a cross-sectional view. Such type of optical fiber is more particularly described in EP 1 148 360. Such micro-structured fiber is composed of hollow channels CC parallel to the longitudinal axis of the optical fiber GL and positioned adjacent to each other around the fiber core CF according to a selected pitch to define a meshed structure (which can also be called "a photonic crystal"), and made in the material composing the sheath GF which surrounds the core CF of the optical fiber GL. It should be reminded that a photonic crystal can be a forbidden energy gap structure (when guiding is provided by the transversal meshing), composed of diffracting elements (here, the hollow channels DC) defining a mesh and the physical properties of which make it possible to control the light propagation. Such fibers can, for example, be obtained by extrusion in a die, as described in the work by Jean-Michel Lourtioz, "Les cristaux photoniques," p. 324, Editions Hermes, 2003.

According to another aspect, a non micro-structured fiber can be used. Nevertheless, to obtain wavelengths in the visible region, it must have a dispersion zero shifted towards the lower wavelengths.

To obtain the requested wavelengths and more particularly the infra-red and the visible spectra, the selected fiber is either totally mono-modal, or mono-modal for the pump wavelength and multimodal, and more particularly bi-modal for the region corresponding to the high order harmonics, for example in the visible spectrum.

Those skilled in the art understand how important the selection of the fiber is, as regards its excitation modes. As a matter of fact for a mono-modal fiber, the inter-mode phase matching are impossible and push up the occurrence threshold of the non-linear effects (a second harmonic generation rate which is greater than 3%-4% is then required). Using a bi-modal fiber in the visible region and a mono-modal fiber in the excitation region (infra-red) makes it possible to lower the occurrence threshold of the non-linear effects (parametric effects) thanks to the evolution of the dispersion curve between the various modes.

On the contrary, in a very multi-modal fiber, the distribution of the incident power on several modes reduces the efficiency of the power transfer towards the low wavelengths. It should be understood that it is impossible to excite a single mode in the visible region if the fiber is very multi-modal for the pump wavelength.

The signal delivered by the exciting source MP is injected into the light guidance means GL, for example in the form of a micro-structured optical fiber. A particular excitation called a "selective injection" makes it possible to obtain the excitation of a transverse mode of a single upper order (for example the so-called mode "LP11") other than the fundamental (so-called "LP01") mode in the visible region.

Such selective injection is, for example, embodied using converging lens L as illustrated in FIG. 2. The transversal motion of the lens and a special orientation of the beam injected into the fiber thus makes it possible to excite a fundamental transverse mode (TEM00) or a single high order (LP11 or LP21).

Besides, the micro-structured fiber is embodied to have a high second harmonic generation rate, for example, thanks to the air-silica interfaces and to the impurities trapped in the silica. A process of optical, electrical or thermal "poling" (in the field of metal processing) of such fiber makes it possible to substantially increase the second harmonic generation rate. This non-linear effect of frequency doubling is directly used to create the super-continuum.

More particularly, the first experiment of the second harmonic generation as observed by Sasaki Y. 10 and al. (Appl. Phys. Lett., 39 no 6 (1981) pp 466-468) in a silica fiber of the core of which is doped with germanium. The polarization is induced by the illumination by a Nd: YAG laser (1,064 micron; peak power 0.8 KW) for several hours. The conversion ratio is of the order of 1%.

A few years later, the experiment was extended by Osterberg and Margulis (Opt. Lett., 11 no. 8 (1986) pp 516-51) on the germanium-doped silica fibers irradiated by the Nd': YAG laser (1,064 micron; peak power 0.5-1 KW; =50 ps). The conversion ratio is much higher and of the order of 5%.

In short, models have demonstrated that this spontaneous second harmonic generation in the fibers is based on the defects and impurities leading to local birefringences. The second harmonic generation is then created in a strong phase mismatching regime and in an incoherent manner from one place to the other.

Preferably, such spontaneous effect is increased by an optical, thermal or electric poling effect making it possible to induce a strong local field in the fiber. Such means make it possible to further improve the results thanks to a better generation of the second harmonic.

According to another aspect which can be combined with the precedent poling, hole type fibers can be used in which the interfaces between silica and the sheath can be a spontaneous source for the generation of the second harmonic.

Performance is increased with the second harmonic generation rate. The higher this rate the brighter the spectrum in the visible region for a given phase matching. High generation rates, for example, between 2% and 10% may, for example, be obtained by doping of the fiber with germanium and/or by poling.

Figure 4:
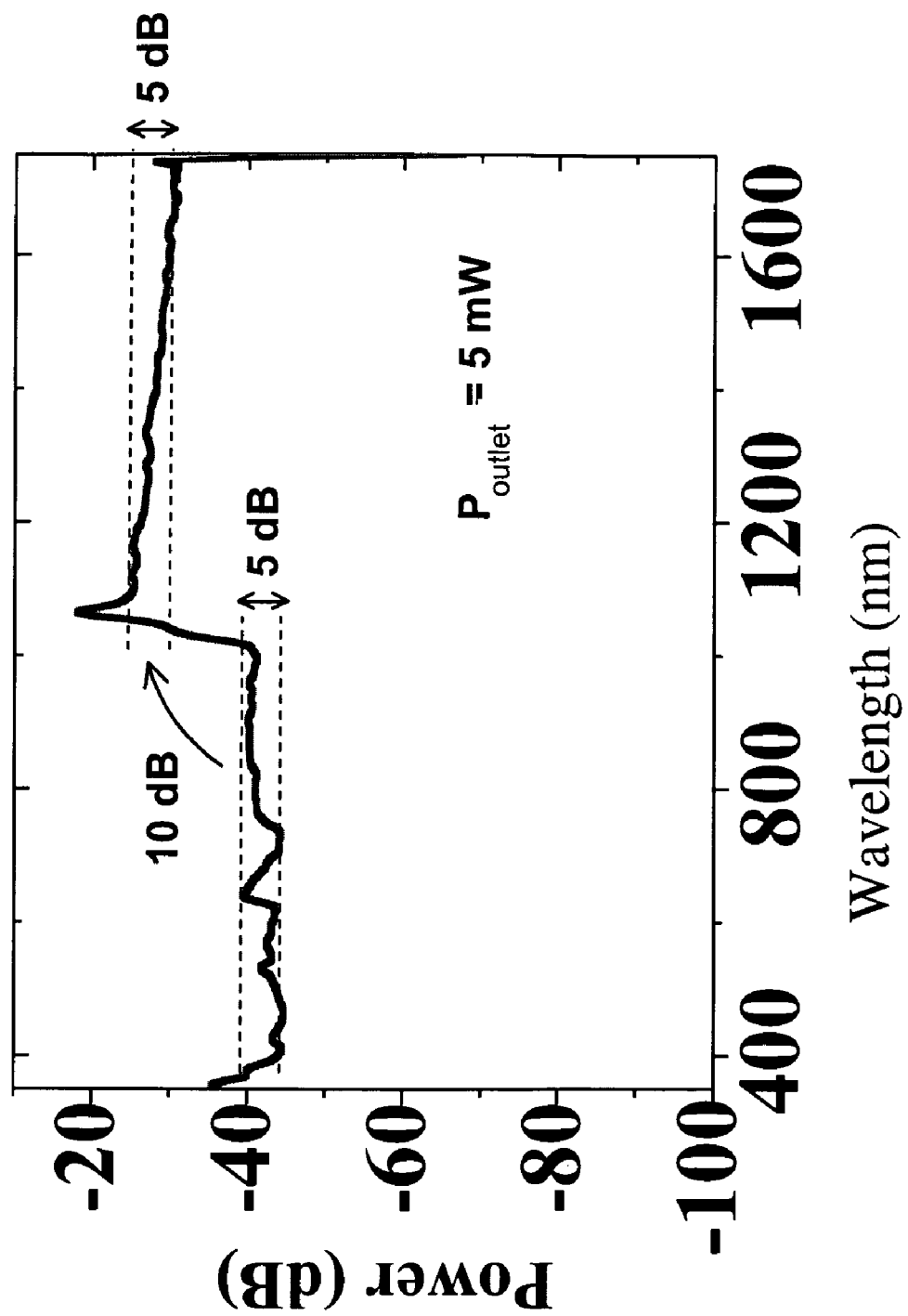
FIG. 4 illustrates an exemplary super-continuum embodied while using one of our devices.

As illustrated in FIG. 4, the super-continuum obtained when using our device has all the frequential components of the visible field as well as in the close infra-red and this with a very uniform power.

Using our device this continuous wide spectrum can be generated on wavelengths between 300 nm and 1.8 μm for substantially uniform power levels.

The laser source is, for example, of the YAG type and can be of mono-modal or multimodal, nanosecond, picosecond, microsecond or continuous type. The fiber used to embody the spectrum of FIG. 4 measures approximately 4 meters.

The types of application are very numerous. As an example, the field of telecommunication, biophotonics and, more particularly, for diagnostic or cellular sorting, opthalmology or consistent optical tomography or confocal microscopy can be mentioned.

Our devices have been described hereabove as an example. It should be noted that those skilled in the art can easily make various modifications without departing from the scope of the appended claims.

The invention claimed is:

1. A device for producing a polychromatic light comprising:
   an optical pump that delivers a first radiation at a first wavelength;
   a light guide; and
   a selective injector that injects the first radiation into the light guide, the light guide being arranged to generate a harmonic corresponding to the selective injector and provide a polychromatic light at an outlet, by nonlinear excitation of the first radiation and the harmonic, and wherein the light guide is substantially mono-modal for the first wavelength and substantially multi-modal for the harmonic to provide the polychromatic light at the outlet.

2. The device according to claim 1, wherein the light guide includes an optical fiber.

3. The device according to claim 2, wherein the optical fiber is a micro-structured fiber.

\* \* \* \* \*